US010911797B2

(12) United States Patent
Griffiths

(10) Patent No.: US 10,911,797 B2
(45) Date of Patent: Feb. 2, 2021

(54) METHOD OF ADJUSTING VIDEO TO MINIMISE OR REMOVE PSE TRIGGERS

(71) Applicant: VIDCHECK LIMITED, Bristol (GB)

(72) Inventor: Scott Griffiths, Bristol (GB)

(73) Assignee: Telestream UK Ltd, Bristol (GB)

( * ) Notice: Subject to any disclaimer, the term of this patent is extended or adjusted under 35 U.S.C. 154(b) by 0 days.

(21) Appl. No.: 15/510,143

(22) PCT Filed: Sep. 9, 2015

(86) PCT No.: PCT/GB2015/052598
§ 371 (c)(1),
(2) Date: Mar. 9, 2017

(87) PCT Pub. No.: WO2016/038358
PCT Pub. Date: Mar. 17, 2016

(65) Prior Publication Data
US 2017/0311012 A1    Oct. 26, 2017

(30) Foreign Application Priority Data
Sep. 10, 2014    (GB) .................................. 1416013.9

(51) Int. Cl.
*H04N 21/2343* (2011.01)
*H04N 5/20* (2006.01)
(Continued)

(52) U.S. Cl.
CPC ....... *H04N 21/234345* (2013.01); *H04N 5/20* (2013.01); *H04N 5/2351* (2013.01);
(Continued)

(58) Field of Classification Search
CPC ............. H04N 5/20; H04N 21/234345; H04N 21/23418
See application file for complete search history.

(56) References Cited

U.S. PATENT DOCUMENTS

| | | | |
|---|---|---|---|
| 2004/0008890 A1* | 1/2004 | Clark | ...................... G06K 9/48 382/197 |
| 2009/0238284 A1 | 9/2009 | Farmer et al. | |

(Continued)

FOREIGN PATENT DOCUMENTS

| | | | |
|---|---|---|---|
| WO | 03090168 A1 | 10/2003 | |
| WO | WO-03090168 A1 * | 10/2003 | ............... G06T 5/00 |
| WO | 2009133403 A2 | 11/2009 | |

OTHER PUBLICATIONS

International Search Report and Written Opinion for International Application No. PCT/GB2015/052598, dated Nov. 19, 2015—9 Pages.

*Primary Examiner* — Jefferey F Harold
*Assistant Examiner* — Omer Khalid
(74) *Attorney, Agent, or Firm* — RatnerPrestia

(57) ABSTRACT

A method of adjusting video image data to reduce photosensitive epilepsy ("PSE") triggers, the method including evaluating a sequence of video images to determine if the number of changes in brightness exceeding a predetermined threshold between contiguous images is greater than a predetermined value over a predetermined time or predetermined number of video images; and if the determined number exceeds the predetermined value then applying a correction procedure to the sequence of images. The correction procedure includes: for each image, applying a plurality of candidate brightness changes to the image and subsequently determining which of the applied changes result in the number of changes in brightness between contiguous images exceeding the predetermined threshold being reduced to below the predetermined value; and selecting the determined applied change having the smallest brightness change.

7 Claims, 3 Drawing Sheets

(51) Int. Cl.
*H04N 5/235* (2006.01)
*H04N 21/234* (2011.01)
(52) U.S. Cl.
CPC ..... *H04N 5/2357* (2013.01); *H04N 21/23418* (2013.01); *H04N 21/234381* (2013.01)

(56) References Cited

U.S. PATENT DOCUMENTS

| | | | | |
|---|---|---|---|---|
| 2009/0324074 | A1* | 12/2009 | Dembo | G06T 5/009 382/168 |
| 2013/0182002 | A1* | 7/2013 | Macciola | H04N 1/00116 345/589 |
| 2014/0150012 | A1* | 5/2014 | Mountain | H04N 21/4542 725/32 |
| 2017/0047046 | A1* | 2/2017 | Tam | G09G 5/10 |

* cited by examiner

METHOD OF ADJUSTING VIDEO TO MINIMISE OR REMOVE PSE TRIGGERS

This application is a U.S. National Phase application of PCT International Application No. PCT/GB2015/052598, filed Sep. 9, 2015, which claims the benefit of GB1416013.9, filed Sep. 10, 2014, both of which are incorporated by reference herein.

BACKGROUND

Epilepsy is a common neurological condition where there is a tendency to have seizures that start in the brain. Photosensitive Epilepsy (PSE) is when the seizures are triggered by flashing lights or contrasting light and dark patterns. Individuals with PSE can experience epileptic seizures upon exposure to certain visual stimuli. The exact nature of the stimulus or stimuli that triggers the seizure varies from individual to individual, however the visual trigger for a seizure is generally cyclic, forming a regular pattern in time or space. Typical examples of visual triggers include flashing lights or rapidly changing or alternating images. Several characteristics are common in the trigger stimuli of many PSE prone individuals. The patterns are usually high in luminance contrast, i.e. bright flashes of light alternating with darkness, or white bars against a black background. Contrasts in colour alone, without changes in luminance, are rarely triggers for PSE, although contrasts in the red area of the colour spectrum are more likely to trigger PSE seizures than other colour contrasts.

Television images can be a common visual trigger for PSE seizures. In particular, video images containing sequences which flash in intensity or colour are known to be likely visual stimuli for PSE seizures. The most common of such video images are those that include flash photography or other strobing light effects. Due to this, some countries, most notably the UK and Japan, require television broadcasters to take steps to reduce the possible triggers for PSE in the video images they transmit and/or to warn viewers if there is a sequence of video images about to be transmitted that could cause PSE, for example by means of a presenter warning that "the following sequence contains flash photography" or something similar. In some countries, such as the UK and Japan, television broadcasters are required to check their video content for possible PSE triggers prior to its transmission. The current requirements dictate the video images be checked for flashing and checkerboard or bar type patterns with more than 20nit (measure of brightness) differences over more than one quarter of the screen. These requirements are defined in the International Telecommunication Union (ITU) Standard Ofcom/ITU BT.1702. In some cases alteration of the video is possible using video editing systems to reduce the flashing effects, but this process is laborious, manual, and somewhat haphazard as the process involves a video editor making some changes, producing the video outputs, re-checking the video for PSE triggers, and then if it still fails going back and re-editing the video. This process can be repeated many times and is time consuming, costly, and inexact, particularly as the video can be over-corrected and therefore look of a lower quality than it needs to be to meet the ITU requirement.

SUMMARY

According to a first aspect of the present invention there is provided a method of adjusting video image data to reduce PSE triggers, the method comprising:

analysing a sequence of video images to determine if the number of changes in brightness exceeding a predetermined threshold between contiguous images is greater than a predetermined value over a predetermined time or predetermined number of video images; and if the determined number exceeds the predetermined value then applying a correction procedure to the sequence of images, wherein the correction procedure comprises:

for each image, applying a plurality of candidate brightness changes to said image and subsequently determining which of the applied changes result in the number of changes in brightness between contiguous images exceeding the predetermined threshold being reduced to below the predetermined value; and selecting the determined applied change having the smallest brightness change.

In the event of none of the brightness changes applied to the selected image result in a reduction in the number of occurrences of changes in brightness between contiguous images exceeding the predetermined threshold to below the predetermined value, then the correction procedure may comprise:

determining the value of a parameter for each of the previously applied changes in brightness, the parameter being defined as the sum of;
  a) the reduction in the number of occurrences of a change in brightness exceeding the threshold between contiguous images caused as a result in the applied change in brightness; and
  b) a predetermined constant divided by the applied change in brightness; and selecting the change in brightness having the greatest parameter value.

In the event of none of the brightness changes applied to the selected image result in a reduction in the number of occurrences of changes in brightness between contiguous images exceeding the predetermined threshold to below the predetermined value, then the correction procedure may alternatively comprise:

selecting the image having the greatest number of occurrences of changes in brightness between contiguous images exceeding the predetermined threshold; and replacing said selected image with a copy of the next image or immediately preceding image to the selected image in the sequence.

The applied change in brightness may be non-linearly applied based on the current brightness value, or alternatively may be linearly applied based on the current brightness value.

The step of analysing the sequence of video images to determine if the number of changes in brightness exceeding a predetermined threshold between contiguous images is greater than the predetermined value may comprise:

sub-dividing each image into a plurality of sub-areas, each sub-area in an image having a corresponding sub-area in the same location in each of the remaining images, such that the corresponding sub-areas form a set of co-located sub-areas;

for each sub-area calculating the average brightness;

for each set of co-located sub-areas, determining the number of occurrences of the average brightness changing between contiguous images by an amount greater than the predetermined threshold;

for each image, determine the number of sub-areas in which the average brightness changes by an amount greater than the threshold; and denote the analysis result to be a "fail" if the number of determined sub-areas is greater than a predetermined threshold of the total number of sub-areas in a video image.

The predetermined time over which it is determined if the changes in brightness exceed the predetermined threshold may comprise 1 second.

The predetermined number of video images over which it is determined if the changes in brightness exceed the predetermined threshold may be a number corresponding to 1 second of video data.

According to a further aspect of the present invention there is provided a method of adjusting video image data to reduce PSE triggers, the method comprising:

analysing a sequence of video images to determine if the number of changes in brightness exceeding a predetermined threshold between contiguous images is greater than a predetermined value over a predetermined time or predetermined number of video images; and if the determined number exceeds the predetermined value then applying a correction procedure to the sequence of images, wherein the correction procedure comprises:

selecting the image having the greatest number of occurrences of changes in brightness between contiguous images exceeding the predetermined threshold; and replacing said selected image with a copy of the next image or immediately preceding image to the selected image in the sequence.

DETAILED DESCRIPTION

The Ofcom/ITU Standard and associated guidelines requires that there be no more than three flashes in a one second period occupying more than a quarter of the screen area. The maximum frequency of flashes of three per second (3 Hz) arises as this is typically the lowest frequency of flashes that is known to trigger PSE seizures. PSE sensitivity under 3 Hz is not common.

To check a sequence of video images to determine if there are more than three flashes per second occupying more than a quarter of the screen area, in accordance with one method each image within the video sequence is divided into a number of sub-areas. The actual number of sub-areas is not particularly significant but a sufficient number are required such that a desired percentage of the image/screen area can be measured.

Figure 1:
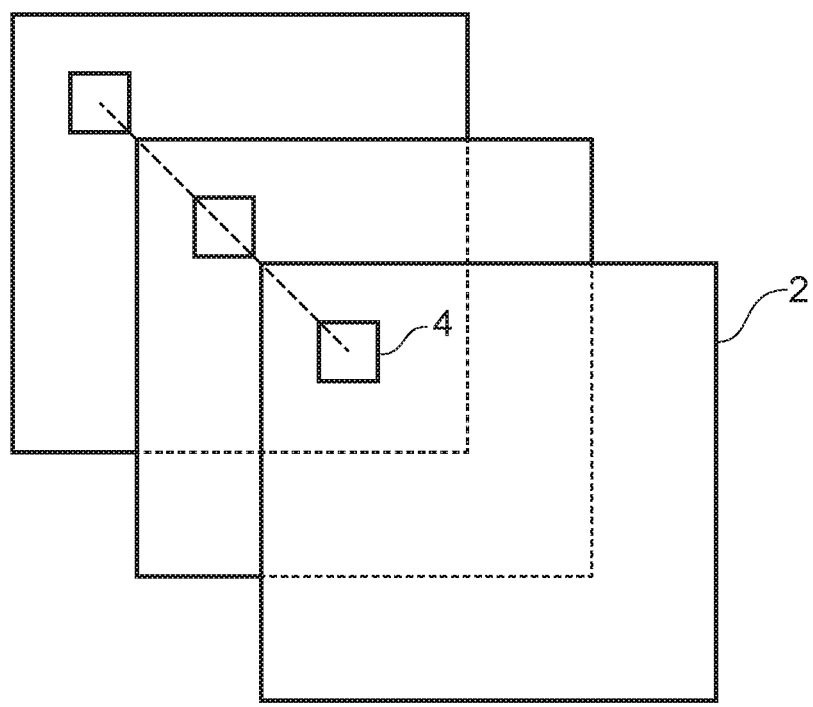
FIG. 1 schematically illustrates a series of video images with co-located sub-areas.

FIG. 1 schematically illustrates a sequence of three video images 2, each image being divided into a number of individual sub-areas 4. In FIG. 1, only a single sub-area 4 for each image is illustrated for the purposes of clarity. As indicated by the broken line passing through each of the indicated sub-area 4 in the respective images 2, each of the sub-areas in the adjacent images are co-located, that is, each sub-area is located in the same place in a video image as the corresponding sub-area in an adjacent image. A "flash" within any given sub-area 4 is considered to occur when a change in brightness greater than a predetermined value occurs between a co-located sub-area in contiguous video images. One method of determining the occurrence of a flash within a sub-area is to calculate the average brightness of the image over that sub-area and store this value for each co-located sub-area within the sequence of images. It is possible to determine the number of occurrences of the average brightness changing between adjacent sub-areas by a value greater than the predetermined value, each occurrence being defined as a "flash". The number of flashes occurring in any given second within co-located sub-area is subsequently counted. If there are more than three flashes per second across a sequence of co-located sub-area then that position is considered to be in violation, and if more than a predetermined percentage of the sub-areas within the video images are in violation then the sequence as a whole is considered to be in violation of the Ofcom/ITU guidelines and an alert may be raised.

One possible definition of a flash includes a change of brightness of at least 20 $Cd/m^2$ (candelas per meter$^2$) between any adjacent co-located sub-areas, but only if the lower of the two values is less than 160 $Cd/m^2$. Depending on the nature of the video data provided, it may be necessary to convert the brightness values to candelas per meter squared from another value, such as for example converting from luminance Y. The conversion may depend on factors such as screen size, screen brightness and contrast and how far away a viewer may be from the screen. To take such factors into account a number of assumptions may be made in performing such a conversion of luminance to candelas per meter$^2$. It will of course be appreciated that other brightness values may equally be used to obtain a definition of a flash occurring without departing from the scope of the present description.

Figure 2:
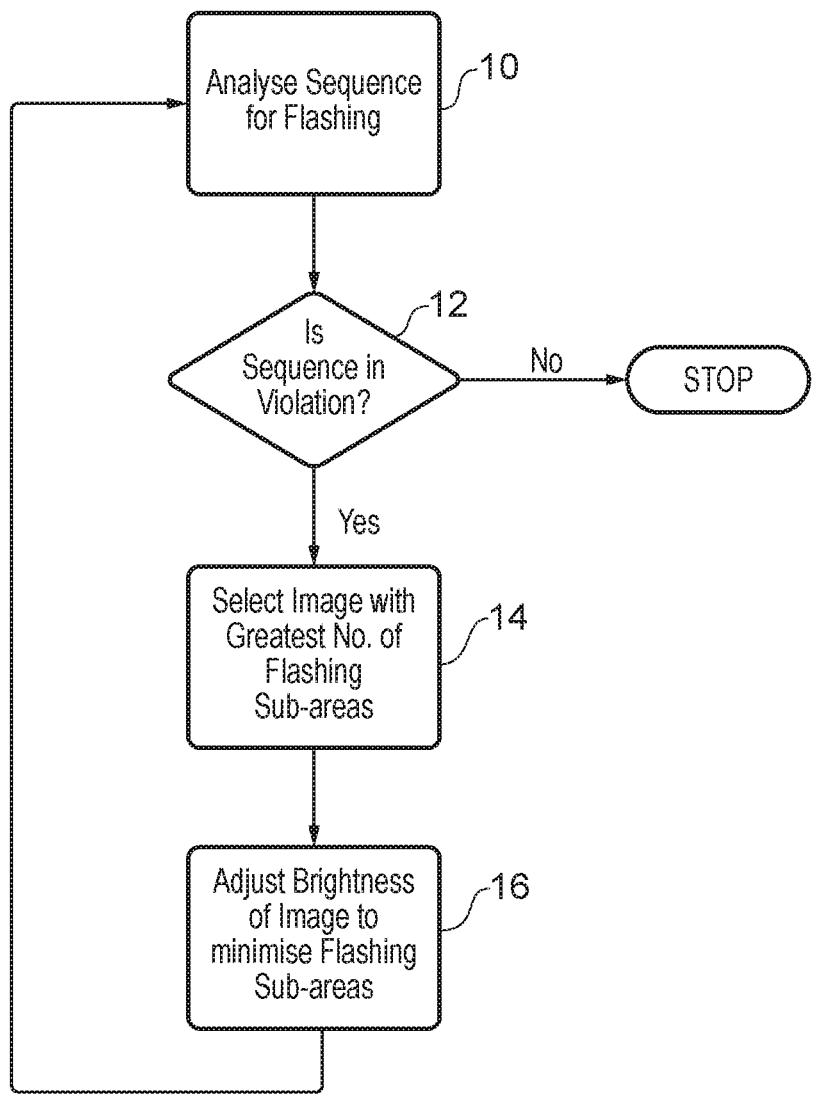
FIG. 2 schematically illustrates a method of correcting video data.

Once a video sequence has been found to contain flashes in contravention of the ITU guidelines it is clearly desirable to subsequently apply some correction to the video sequence to remove all or some of the flashes to make the sequence in compliance with the guidelines. Any correction that is applied should preferably be as subtle as possible so as to minimise any undesirable visual artefacts. In the case of a video sequence in which the images have been sub-divided into individual sub-areas as previously discussed, then it would in theory be possible to apply any corrections to just the individual images in which flashes occur. However, this would mean that changes were only being made to particular parts of a whole video image, which would in general give rise to clearly visible artefacts. It is therefore preferable to apply any desired changes to entire video images. One possible correction methodology is to identify the image that contributes most to the flashing and apply a correction to this image. A schematic illustration of this methodology is provided in FIG. 2. As an initial step 10 the entire sequence of images is analysed for 'flashing', for example as describes with reference to FIG. 1. Based on this analysis, a determination is made at step 12 as to whether the sequence is in violation of the guidelines. If it is not then clearly no correction is required and no further action is taken. However, if the sequence is determined to be in violation then, at subsequent step 14, the image that contains the most flashing sub-areas is selected and in further step 16 the brightness of the image as a whole is changed in order to minimise the number of flashing sub-areas. For example, this may be achieved by applying both an increase and a decrease in brightness to determine which has the greater impact on reducing the number of flashing sub-areas. Having changed the brightness of the image in question to minimise its contribution to the sequence's flashing, the entire video sequence is analysed again at step 10. If the video sequence as a whole no longer violates the ITU Standard then the correction procedure is stopped. However, if the video sequence remains in violation of the ITU guidelines the method is repeated.

The correction methodology described above with reference to FIG. 2 whilst being effective is not necessarily an optimal correction methodology to apply. For example, if the video sequence has different areas over the full image area in which flashing occurs it can prove that no overall improvement to the sequence can be made by adjusting the brightness of individual images. Consequently, a further correction methodology is proposed as follows.

Figure 3:
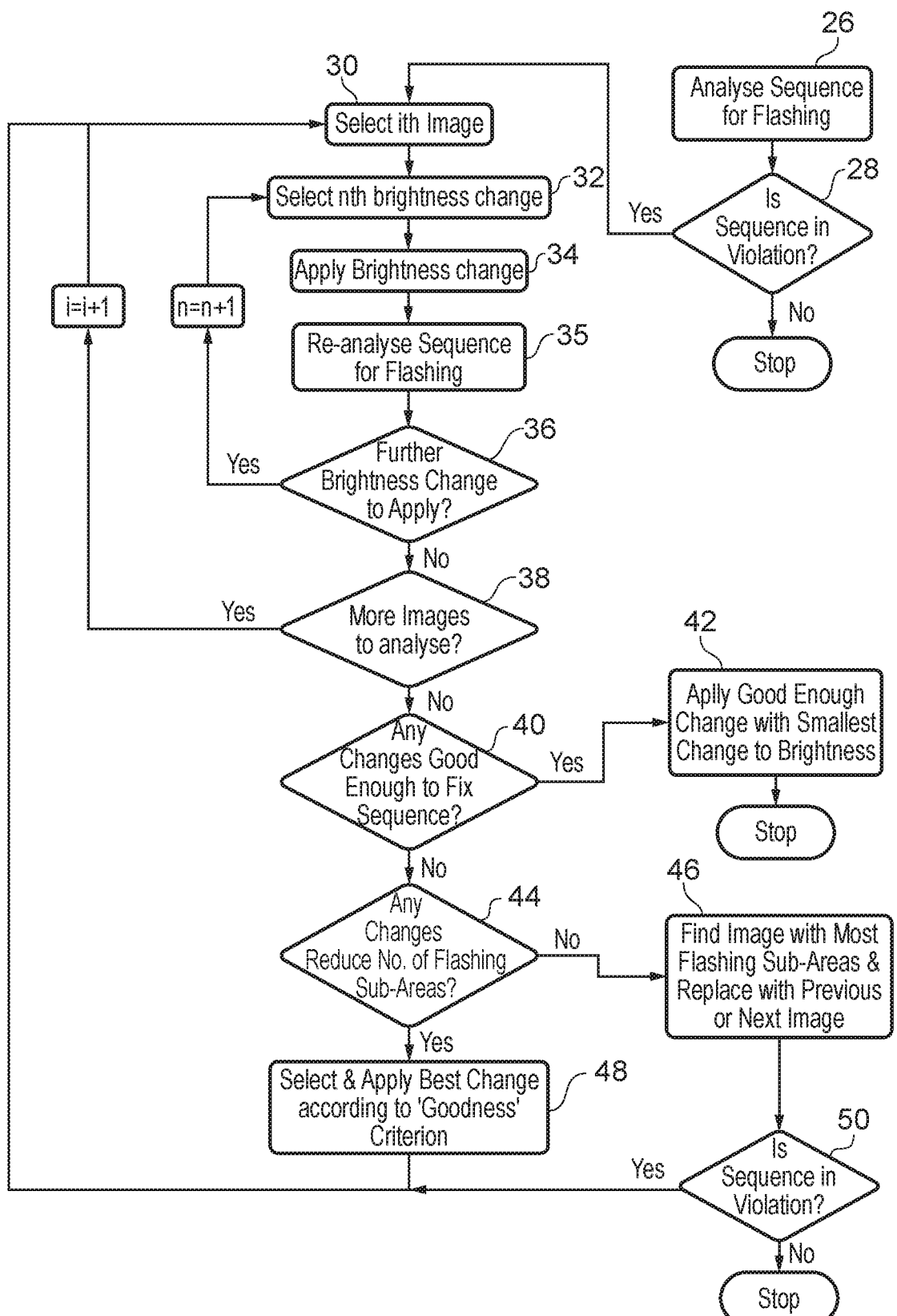
FIG. 3 schematically illustrates a further method of correcting video data.

With reference to FIG. 3, which schematically illustrates the further correction methodology, first in step 26 the sequence is analysed for flashing and the sub-areas which contribute to the flashing noted. If the sequence is determined to be in violation (step 28) then the first image in the violating sequence is selected (step 30). In FIG. 3 this is denoted as the 'ith image'. Next in step 32 a brightness change is selected (nth change). This change will brighten or darken the image by an amount taken from a list of possible brightness changes. In step 34 the selected change is applied to the selected image, and in step 35 the sequence is reanalysed for flashing and the flashing sub-areas noted. Steps 34 and 35 are repeated for each possible brightness change until it is determined that there are no further brightness changes to apply to the selected image (step 36). The next image is then selected and steps 32-36 repeated.

Once it has been determined that there are no more images to select (step 38) and apply brightness changes to, the data noted from each brightness change to each image is analysed to see which changes, if any, would cause the sequence to no longer be in violation (step 40). If any changes are sufficient then the one with the smallest change to the brightness is selected in step 42 and used to correct the sequence.

If no changes are good enough to correct the sequence then it is determined if any changes reduce the total number of flashing sub-areas compared to making no change (step 44). If not then in step 46 the image which contributes the most flashing sub-areas is selected and replaced with either the previous or next image in the sequence. As the selected image is now a repeat of the previous or next image it cannot contribute any flashing sub-areas and so this procedure is guaranteed to reduce the number of flashing sub-areas. After substituting the image the sequence is reanalysed (step 50) and the process stops if the sequence is no longer in violation.

If one or more brightness changes do reduce the number of flashing sub-areas (step 44) the best such change is selected and applied (step 48). To achieve this, a parameter referred to as the "goodness" of each brightness change is determined, where the "goodness" is calculated as $$\text{Goodness} = (\text{reduction of flashing sub-areas}) + \text{lambda}/(\text{change in brightness})$$

where the change in brightness is the absolute value of brightness change applied and lambda is an empirically derived constant. This favours smaller changes in brightness that have a proportionally larger effect.

The brightness change that results in the greatest "goodness" value is then selected as the best change, at step 48, and this change is applied to the selected image.

If the process has not stopped then steps 30-40 are repeated such that another change is selected which either reduces the number of flashing sub-areas or fixes the sequence. Allowing for an image to be repeated when no brightness change is effective (step 46) means that the process will always terminate. That is, even the most extreme and pathological PSE trigger cases will be corrected by this procedure.

The changes in brightness applied to the individual images referred to above are preferably applied in a non-linear manner so as to avoid clamping the brightness to absolute white or black. One possible solution for achieving this is to simply scale the increase or decrease in brightness value based on the original value. For example, the brightness may be expressed in luminance, the unit of which is the nit. When expressed in nits the brightness may range from 0 (black) to 200 (white). To increase the brightness the change in nits may be determined as follows;

$$\text{Brightness} = \text{Brightness} + a(200 - \text{Brightness})/100$$

where brightness is measured in nits

Where a has value from 0 to 100, depending on how large a change in brightness is desired. If a=0 there is no change, whereas if a=100 all values change to 200 nits. Similarly for darkening;

$$\text{Brightness} = \text{Brightness} - a(\text{Brightness})/100$$

It will be appreciated that the correction procedure described above with reference to FIG. 3 may be used in combination with any methodology for determining whether or not the video sequence violates the ITU guidelines and is not limited to use with the particular determination methodology described with reference to FIG. 1. The correction procedures described above may be readily implemented using known digital signal processing techniques and systems and provide the ability for digital video data to be automatically corrected, by application of the correction procedures, to ensure that video data to be broadcast is fully compliant with the ITU guidelines for removing PSE triggers. The correction procedure is consistent and repeatable whilst minimising any visual artefacts in the corrected video data.

The invention claimed is:

1. A method of adjusting video image data to reduce photosensitive epilepsy ("PSE") triggers, the method comprising:
    analysing a sequence of images to determine that a number of changes in brightness exceeding a predetermined threshold between contiguous images is greater than a predetermined value over a predetermined time or predetermined number of video images; and
    applying a correction procedure to the sequence of images, wherein the correction procedure comprises:
        for each image, applying a plurality of candidate brightness changes to the image;
        subsequently determining which of the applied candidate brightness changes result in the number of changes in brightness exceeding the predetermined threshold between contiguous images being reduced to below the predetermined value;
        selecting the determined applied candidate brightness change having a smallest brightness change; and
        modifying the sequence of images by applying the determined applied candidate brightness change having the smallest brightness change.

2. A method of adjusting video image data to reduce photosensitive epilepsy ("PSE") triggers, the method comprising:
    analysing a sequence of images to determine that a number of changes in brightness exceeding a predetermined threshold between contiguous images is greater than a predetermined value over a predetermined time or predetermined number of video images;

and applying a correction procedure to the sequence of images, wherein the correction procedure comprises:

for each image, applying a plurality of candidate brightness changes to the image;

subsequently determining that none of the applied candidate brightness changes result in the number of changes in brightness exceeding the predetermined threshold between contiguous images being reduced to below the predetermined value;

subsequently determining the value of a parameter for each of the previously applied candidate brightness changes, the parameter being defined as the sum of:

a) the reduction in the number of occurrences of a change in brightness exceeding the threshold between contiguous images caused as a result in the respective applied candidate brightness change; and b) a predetermined constant divided by the respective applied candidate brightness change;

selecting the applied candidate brightness change having a greatest parameter value; and modifying the sequence of images by applying the applied candidate brightness change having the greatest parameter value.

3. The method of claim 1, wherein the applied change in brightness is non-linearly applied based on the current brightness value.

4. The method of claim 1, wherein the applied change in brightness is linearly applied based on the current brightness value.

5. The method of claim 1, wherein the step of analysing the sequence of video images to determine that the number of changes in brightness exceeding a predetermined threshold between contiguous images is greater than the predetermined value comprises:

sub-dividing each image into a plurality of sub-areas, each sub-area in an image having corresponding sub-areas in the same location in each of the remaining images, such that the corresponding sub-areas form a set of co-located sub-areas;

for each sub-area calculating the average brightness;

for each set of co-located sub-areas, determining the number of occurrences of the average brightness changing between contiguous images by an amount greater than the predetermined threshold;

for each image, determine the number of sub-areas in which the average brightness changes by an amount greater than the threshold; and denote the analysis result to be a "fail" if the number of determined sub-areas is greater than a predetermined threshold of the total number of sub-areas in an image.

6. The method of claim 1, wherein the predetermined time over which it is determined if the changes in brightness exceeds the predetermined threshold comprises 1 second.

7. The method of claim 1, wherein the predetermined number of video images over which it is determined if the changes in brightness exceeds the predetermined threshold is a number corresponding to 1 second of video data.

* * * * *

UNITED STATES PATENT AND TRADEMARK OFFICE
CERTIFICATE OF CORRECTION

PATENT NO.        : 10,911,797 B2  
APPLICATION NO.   : 15/510143  
DATED             : February 2, 2021  
INVENTOR(S)       : Scott Griffiths Page 1 of 1

It is certified that error appears in the above-identified patent and that said Letters Patent is hereby corrected as shown below:

On the Title Page

Item (71) Applicant: "VIDCHECK LIMITED, Bristol (GB)"
Should read -- TELESTREAM UK LTD, Bristol (GB) --

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*